United States Patent
Bröker et al.

(10) Patent No.: US 6,773,196 B2
(45) Date of Patent: Aug. 10, 2004

(54) BALL JOINT

(75) Inventors: Klaus Bröker, Bohmte-Hunteburg (DE); Martin Rechtien, Neuenkirchen-Vörden (DE); Wolfgang Kleiner, Wagenfeld (DE); Reinhard Buhl, Bohmte (DE)

(73) Assignee: ZF Lemförder Metallwaren AG, Stemwede-Dielingen (DE)

( * ) Notice: Subject to any disclaimer, the term of this patent is extended or adjusted under 35 U.S.C. 154(b) by 0 days.

(21) Appl. No.: 10/019,736
(22) PCT Filed: Feb. 9, 2001
(86) PCT No.: PCT/DE01/00510
§ 371 (c)(1), (2), (4) Date: Jul. 24, 2002
(87) PCT Pub. No.: WO01/59312
PCT Pub. Date: Aug. 16, 2001

(65) Prior Publication Data
US 2003/0077114 A1 Apr. 24, 2003

(30) Foreign Application Priority Data
Feb. 9, 2000 (DE) .......................................... 100 05 979

(51) Int. Cl.⁷ .............................................. F16C 11/00
(52) U.S. Cl. ...................................... 403/133; 403/135
(58) Field of Search ................................ 403/122, 133, 403/134, 135, 136, 141, 288

(56) References Cited

U.S. PATENT DOCUMENTS 2,664,029 A   12/1953  Higgins
3,108,830 A   10/1963  Fierstine
3,588,201 A    6/1971  Schmidt
4,318,627 A *  3/1982  Morin .......................... 403/133
4,504,166 A *  3/1985  Morin .......................... 403/147
5,395,176 A *  3/1995  Zivkovic ...................... 403/122
5,678,947 A * 10/1997  Urbach et al. ............... 403/288
6,092,954 A *  7/2000  Mizutani ...................... 403/140

FOREIGN PATENT DOCUMENTS

| DE | 196 39 626 A1 | 3/1997 |
| DE | 198 42 198 A1 | 4/2000 |
| EP | 0 082 638 A1  | 6/1983 |
| EP | 0 860 619 A1  | 8/1998 |
| EP | 0 867 158 A2  | 9/1998 |

* cited by examiner

Primary Examiner—John R. Cottingham
(74) Attorney, Agent, or Firm—McGlew and Tuttle, P.C.

(57) ABSTRACT

A joint housing (1) has a housing recess (2), a pivot pin (4), mounted in the housing recess. The pivot pin has a joint ball (3) provided with a surface protection. A pin section protrudes from a housing opening (18), with a bearing shell (5) arranged between the joint housing and the joint ball, and with a closing ring (7), which closes the housing recess of the joint housing and tensions the bearing shell arranged therein in the joint housing. The closing ring follows essentially with its inner contour the outer contour of the bearing shell due to a bevel or a radius formed. The closing ring (7) to be inserted into the joint housing is fixed in its position in the joint housing (1) and has a sealing lip (17) which is in contact with the joint ball (3) under elastic pretension on the side of the housing opening (18) through which the pin section of the pivot pin (4) protrudes from the joint housing (1).

22 Claims, 6 Drawing Sheets

BALL JOINT

FIELD OF THE INVENTION

The invention relates to ball-and-socket joints that are used in many different areas, but especially in the manufacture of vehicles, in assembly groups for the wheel suspension.

BACKGROUND OF THE INVENTION

Such ball-and-socket joints comprise a joint housing which is open on at least one side with a housing recess and with a pivot pin, which is mounted in the housing recess with its joint ball provided with a surface protection, whose pin section protrudes from a housing opening. A bearing shell, which is necessary for the high loads on such joints in motor vehicles, is arranged between the joint housing and the joint ball.

It is very essential for the durable function of the ball-and-socket joint (long-term service life) to take design measures which make possible a permanent lubrication with joint grease. The friction between the components movable in relation to one another is considerably reduced as a result. A sealing bellows is used as the grease reservoir in conventional joints.

However, the sealing bellows is also indispensable for sealing the components of ball-and-socket joints for motor vehicles against contamination and environmental effects. The service life of a ball-and-socket joint may therefore be substantially reduced if, e.g., the sealing bellows is damaged and becomes leaky or is aged prematurely as a consequence of mechanical or thermal overstress or because of increased exposure to ozone, so that it no longer assumes its sealing function.

Another problem arises due to the fact that motor vehicles are often cleaned with high-pressure cleaning devices. It was possible to determine that these devices generate pressures that are able to lift off the sealing bellows from the components of the joint at least briefly and slightly. Leaks that develop as a result permit the entry of undesired media into the interior of the joint.

SUMMARY AND OBJECTS OF THE INVENTION

The technical object of the present invention is to achieve improved sealing of the ball-and-socket joint against the penetration of contaminants or moisture between the bearing shell and the joint ball while ensuring optimized lubrication function of the movable components of the joint at the same time.

The technical object is accomplished according to the present invention by a ball-and-socket joint with a joint housing which is open on at least one side, with a housing recess, with a pivot pin, which is mounted in the housing recess with its joint ball provided with surface protection, and whose pin section protrudes from the housing opening. A bearing shell is arranged between the joint housing and the joint ball. A closing ring closes the housing recess of the joint housing, tensions the bearing shell arranged therein in the joint housing, and essentially follows the outer contour of the bearing shell with its inner contour due to a bevel or a radius. It is proposed according to the present invention that the closing ring, which is to be inserted into the joint housing and is fixed on the side of the housing opening, through which the pin section of the pivot pin protrudes from the joint housing, be provided with a sealing lip which is in contact with the joint ball under elastic pretension.

It is essential for the practical embodiment of the present invention that the joint ball be provided with a surface protection, so that it has an extremely low roughness as well as a corrosion protection as a consequence of this treatment, because long service life of the sealing lip which is in sliding contact with the joint ball can be guaranteed by this only. The maximum surface roughness (Ry) should be approximately between 1 $\mu$m and 5 $\mu$m.

The present invention offers a number of advantages. Thus, it would be possible to use two different types of grease within the ball-and-socket joint without mixing having to be feared. A first type of lubricating grease with optimal lubricating and sliding properties is provided between the joint ball and the bearing shell, with the sealing lip sealing the grease reservoir and holding it in this area of the joint. A second type of grease is accommodated in the sealing bellows and it assumes mainly a sealing function.

The additional sealing lip within the ball-and-socket joint thus guarantees not only an optimal lubrication of the joint, but at the same time also an optimal sealing function, which is of considerable advantage over prior-art designs especially in case of the use of high-pressure cleaning devices. A ball-and-socket joint according to the present invention could possibly even do entirely without a sealing bellows. At any rate, the efforts needed to achieve the firm seating of the sealing bellows can be reduced, however, so that it appears to be possible to make do without the use of tension rings, as a result of which not only the number of components present but also the efforts needed during the mounting of the ball-and-socket joints according to the present invention and consequently the costs can be reduced.

The closing ring may be designed in the manner of a flange on the side facing the pin section of the pivot pin and may have at least one bulge on its outer contour. By means of this the closing ring to be pressed into the joint housing is caused to engage the at least one recess of the inner surface of the joint housing in a fixed position.

According to another embodiment of a ball-and-socket joint according to the present invention, it is, furthermore, proposed that the sealing lip be made of rubber and that it be vulcanized to the closing ring, i.e., that a one-part component with the closing ring be manufactured or that it be inserted into a groove provided in the closing ring.

According to the present invention, the bulge on the outer contour of the closing ring may advantageously have a height of 0.2 mm to 0.3 mm in relation to the adjacent areas of its outer contour. This is already sufficient to achieve a significant increase in the pull-out strength due to this bulge engaging a corresponding recess of the joint housing over a depth corresponding to the height of the bulge, taking into account tolerances.

At the same time, a displacement of the bearing shell in the joint housing is prevented during the manufacturing process, especially during the at least partial material deformation, by which the flange-like section of the closing ring in the joint housing is determined and which may also be carried out by flanging the end areas of the joint housing. During the stressing of the joint during use, the solution according to the present invention guarantees secure fixation of the bearing shell against slipping, which could otherwise occur as a consequence of permissible wobbling movements of the pivot pin.

In a variant of the present invention, the bulge on the outer contour of the closing ring has the shape of a circular ring, which engages a circular groove provided on the inner surface of the joint housing. A plurality of circular ring-shaped bulges, which have, e.g., a sawtooth-like contour, may, of course, also be present.

If a plurality of circular ring-shaped bulges with a sawtooth-shaped contour are used, it may be advantageous to make a first flank of this sawtooth-shaped contour longer than each additional flank and to cause as a result the bulge extending with a slope in the direction of the housing opening to engage the groove, which has the same slope and extends circularly on the inner surface of the joint housing, in an interlocking manner. The firm seating of the closing ring in the joint housing is considerably improved as a result. To reduce the weight and to improve the elasticity of the components contacting one another, it is, furthermore, possible for the bulge extending circularly in the form of a ring on the outer contour of the closing ring to be interrupted in some areas or for the bearing shell to have a reduced wall thickness compared with the rest of its wall thickness in at least some sections in the area that is in contact with the inner contour of the closing ring.

To avoid the introduction of contaminants into the area between the bearing shell and the joint ball, it is, furthermore, advantageous to provide a smooth transition from the joint ball to the pivot section of the pivot pin, i.e., to keep the radius R of the transition between the joint ball and the pin section of the pivot pin at a minimum. There shall be no flute according to the present invention in this area.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF THE PREFERRED EMBODIMENTS

Figure 1:
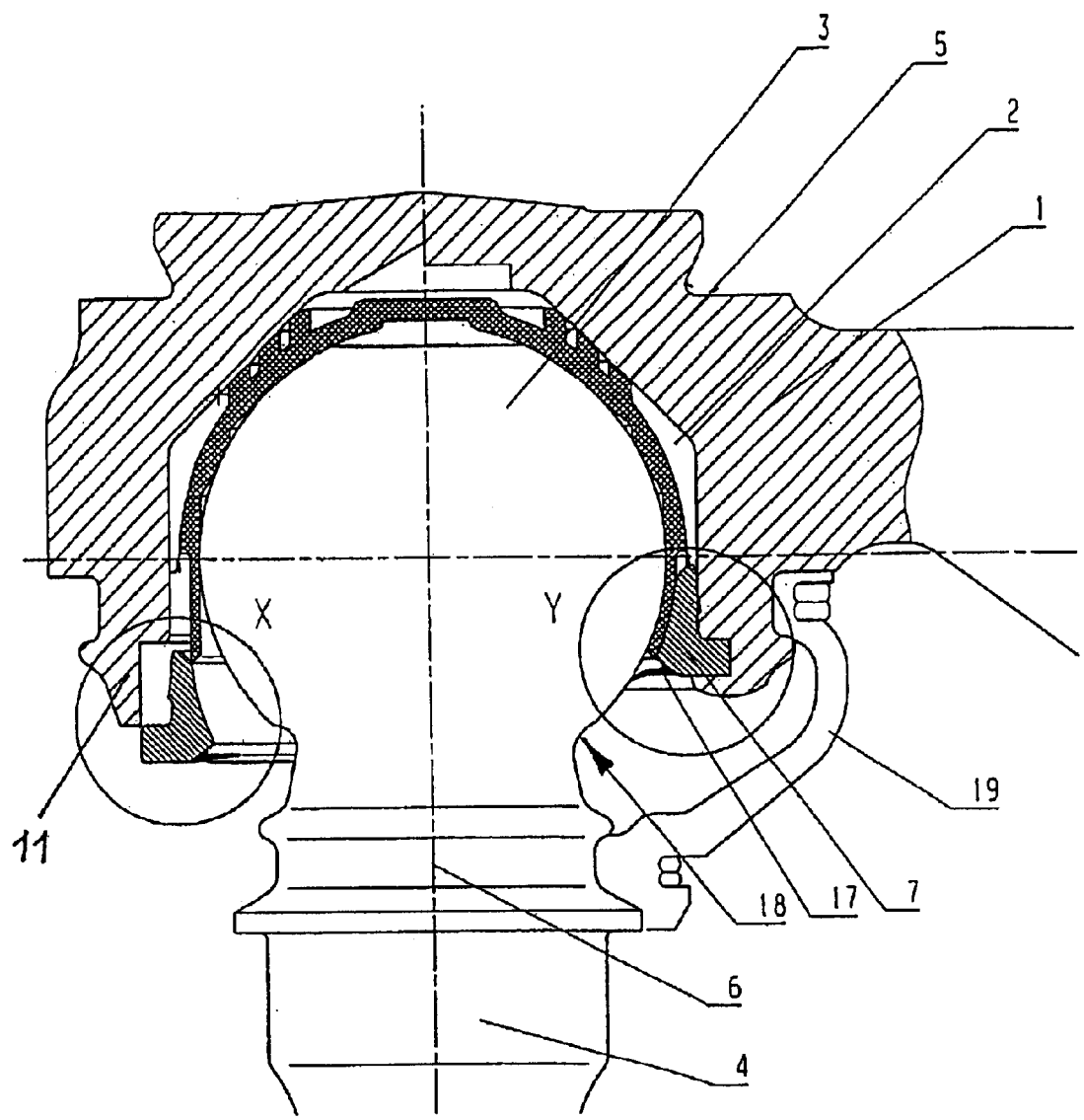
FIG. 1 is a sectional view of a ball-and-socket joint according to the present invention.
Figure 1A:
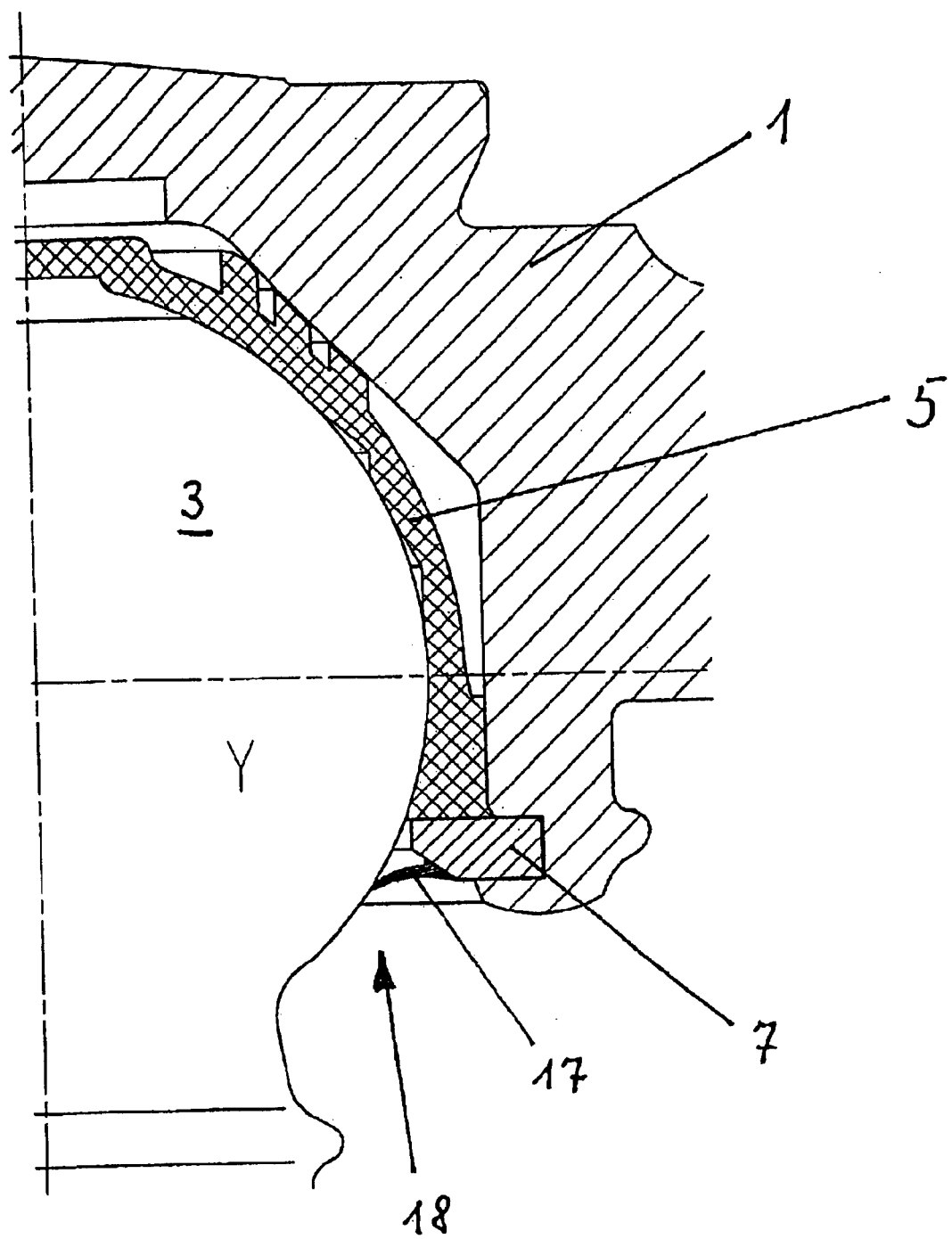
FIG. 1a is a sectional view of another ball-and-socket joint according to the present invention.
Figure 1B:
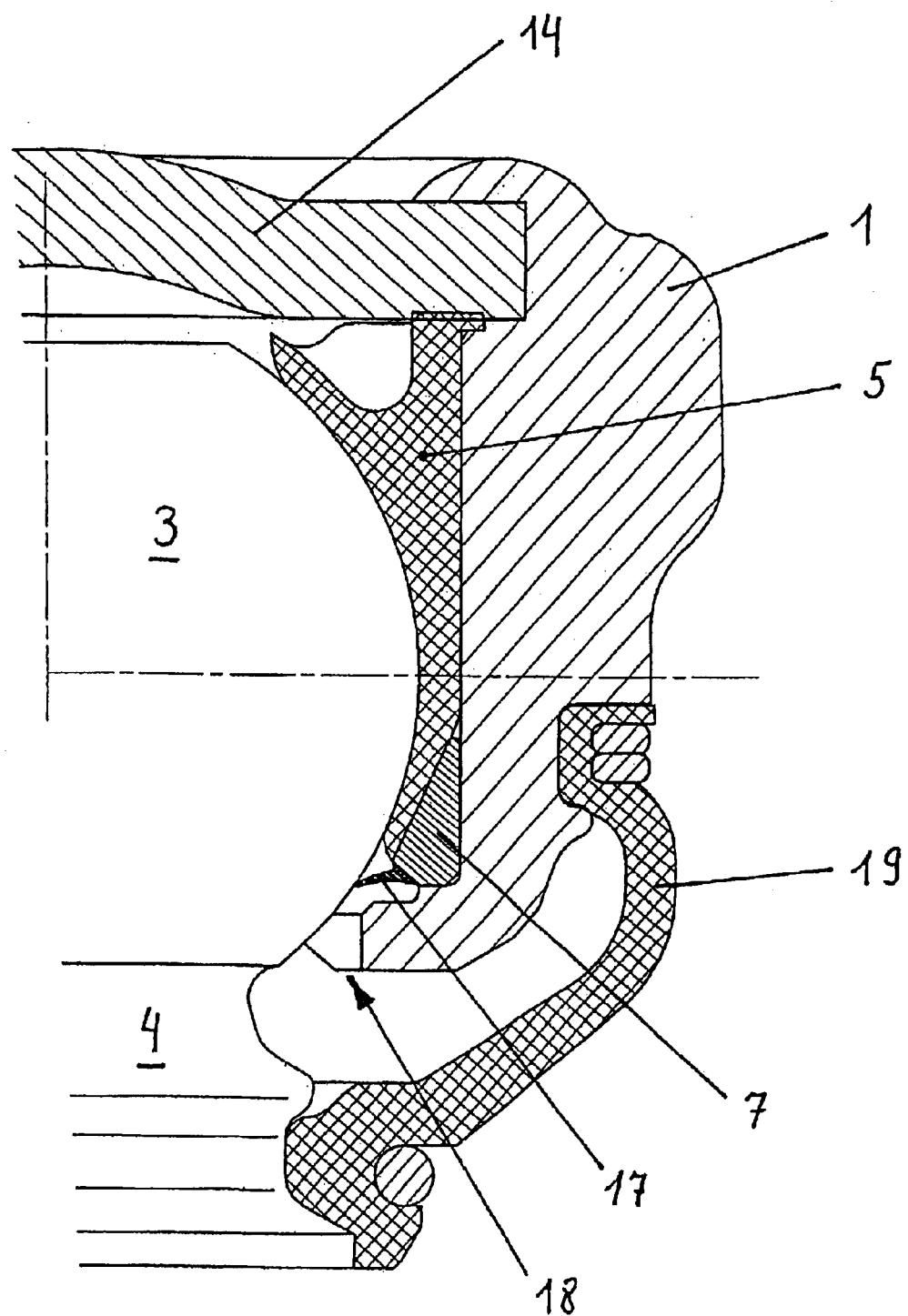
FIG. 1b is a sectional view of a third ball-and-socket joint according to the present invention.

Referring to the drawings in particular, FIGS. 1, 1a and 1b show sectional views of ball-and-socket joints according to the present invention. The view in FIG. 1 was divided into two parts for better illustration. The bearing is shown to the left of the symmetry axis 6 before the closing ring 7 is pressed in and before the joint housing 1 is subsequently partially flanged. The part to the right of the symmetry axis 6 illustrates the bearing in the completely mounted state, i.e., with the closing ring 7 pressed in. As can be recognized, the joint ball 3 of the pivot pin 4 is accommodated in the housing recess 2 of the joint housing 1 together with the bearing shell 5 surrounding the said joint ball. The bearing shell 5 is supported in a plurality of positions of the inner surface 13 of the joint housing 1 against the inner surface 13 formed by the bowl-shaped housing recess 2. Due to its flange-like design, the closing ring 7 is supported on the surface 12 extending circularly in a ring-shaped manner which is formed by the flanging of the ends 11 of the joint housing 1. On the side of the housing opening 18, it has a sealing lip 17, which is injection-molded in one piece on the closing ring. The bearing shell 1 is made of plastic and the closing ring 7 of a metallic material. A sealing bellows 19, whose interior space is a grease reservoir, is used to seal the ball-and-socket joint on the outside.

FIG. 1a shows a ball-and-socket joint whose closing ring 7 has no teeth in the sense of the above-described design, but is fixed simply by flanging the end area of the housing edge 11. The closing ring has an approximately rectangular cross-sectional shape, with the sealing lip made in one piece with a chamfer on the side facing the joint ball 3.

By contrast, FIG. 1b shows a ball-and-socket joint which has a joint housing 1 that has two opposite openings. The pivot pin 4 passes through the housing opening 18 in the above-described manner, while the second, upper opening is closed by placing a cover 14 on it, which is in turn fixed by the material deformation of the upper edge of the housing. The closing ring 7 also has no teeth. It is pushed into the housing recess 2 in the axial direction.

Figure 2:
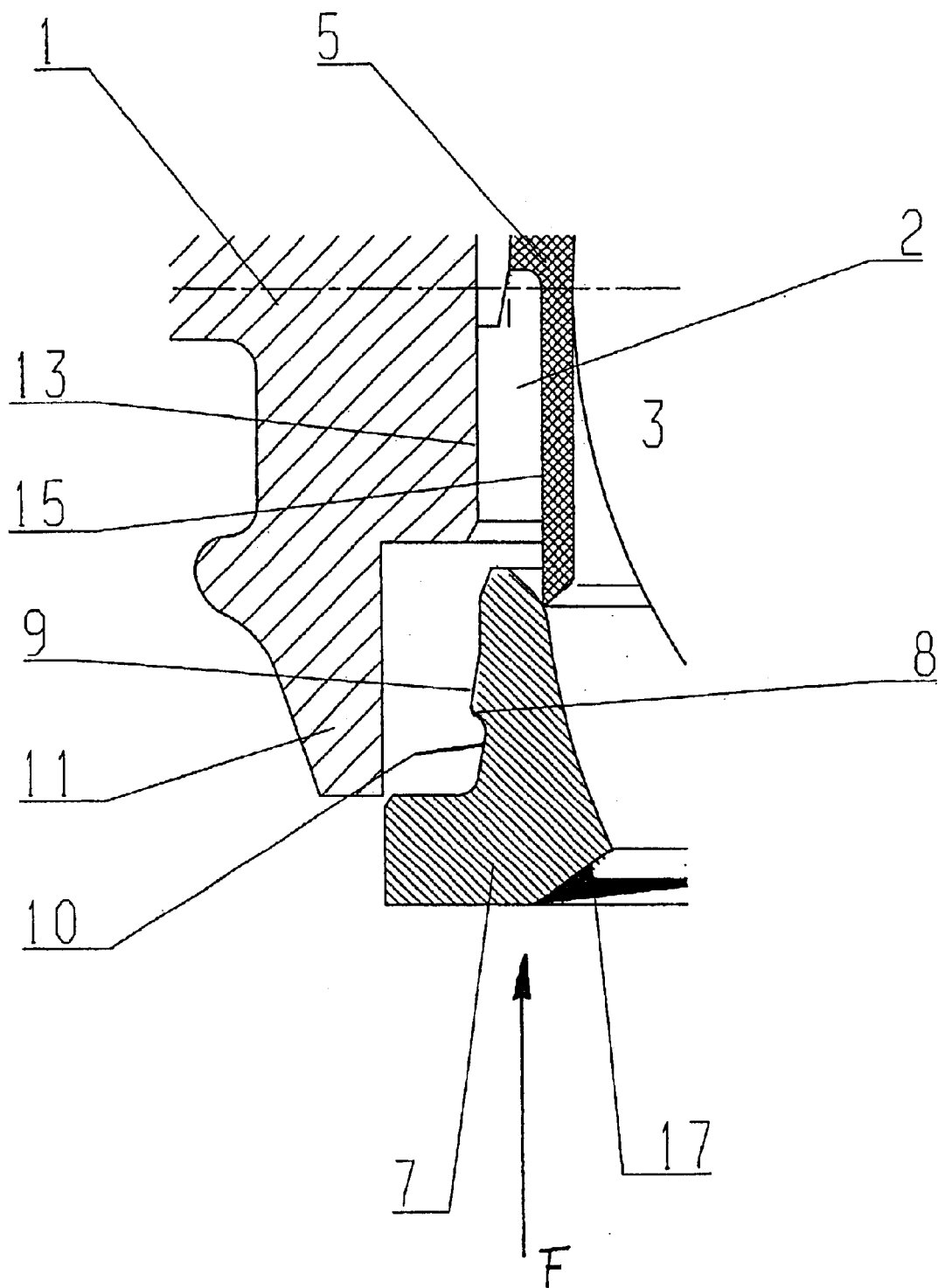
FIG. 2 is detail view X according to FIG. 1.
Figure 3:
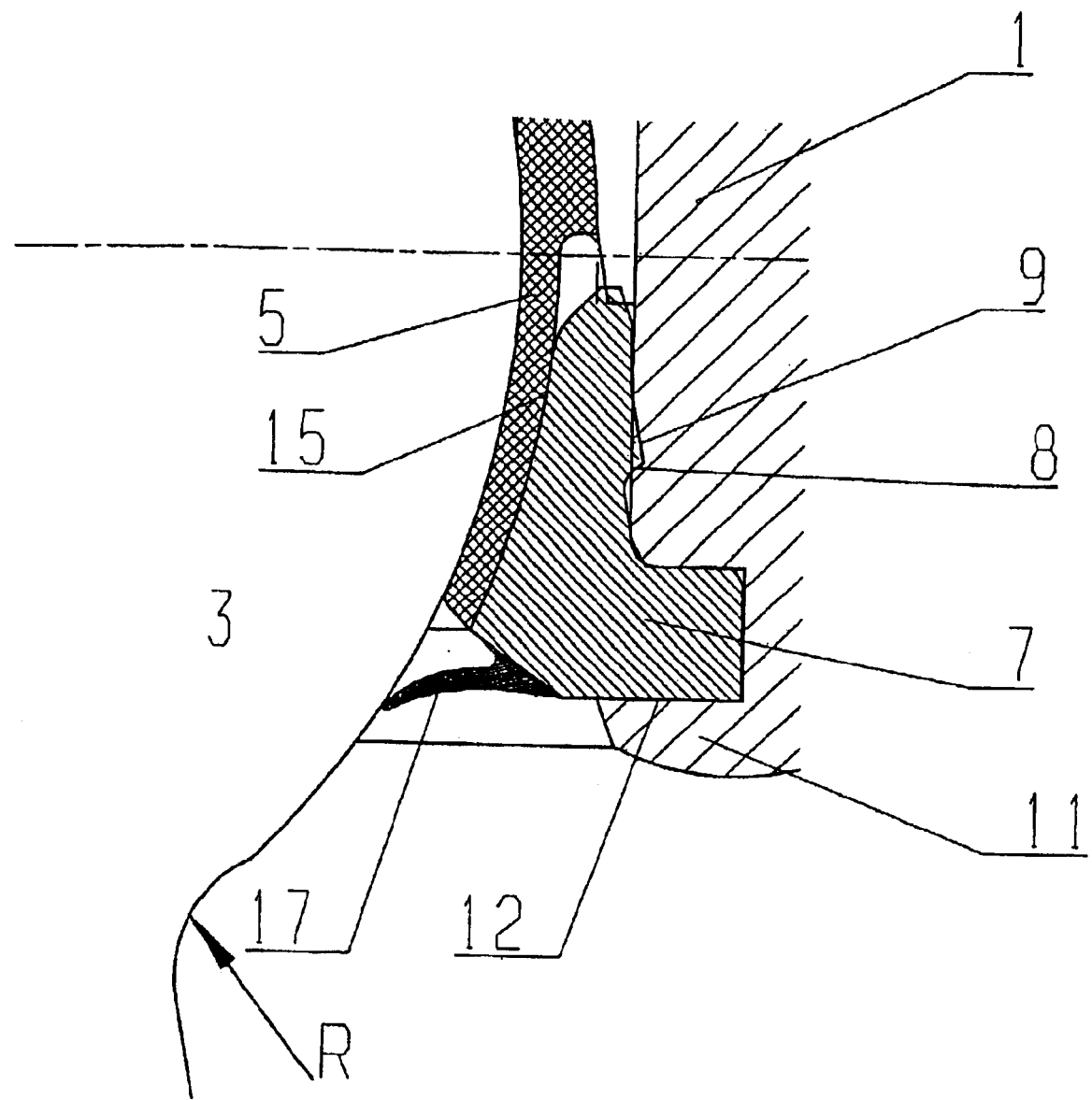
FIG. 3 is a detail view Y according to FIG. 1.

FIGS. 2 and 3, which show details X and Y from FIG. 1 in enlarged views, illustrate once again in detail the design of the closing ring 7 with the sealing lip 17 made in one piece with it. As can be recognized, the closing ring 7 follows, on its inner contour, essentially the course of the outer contour of the bearing shell 5. The bulge 8 is formed on the outer contour of the closing ring 7. The sealing lip 17 is slidingly in contact with the joint ball 3 of the pivot pin 4 in the view in FIG. 3. The radius R of transition between the joint ball and the pin section of the pivot pin 4 is very small, which means that the transition is very flat. Due to such a shape, which avoids the use of flutes in the transition area, it can be achieved that the sealing lip 17 is always sealingly in contact during the pivoting of the pivot pin and contaminants, which may be deposited in the interior of the joint in the case of prior-art pivot pins provided with a flute in this area, are not transported into the interior of the joint.

In the example shown, the bulge 8 is designed corresponding to an advantageous embodiment of the present invention as a circular bulge extending in a ring-shaped manner on the outer contour of the closing ring 7 and it has a sawtooth-like cross section. It can be recognized especially from FIG. 2 that one flank 9 of this sawtooth-like cross section is made longer compared with the other flank 10, so that the bulge 8 extending circularly in a ring-shaped manner extends with a slope in the direction of the opening of the housing opening 2. As a result, it will engage, in the manner of a barb, a groove, which extends circularly on the inner surface of the housing 1 and has a corresponding slope and cannot be seen in the figure. It was found that a design of the closing ring 7 in which the bulge 8 formed on the outer contour of the ring has a height of 0.2 mm to 0.3 mm in relation to the rest of the outer surface brings about a pull-out strength which is nearly twice as high in the case of, e.g., ball-and-socket joints with aluminum housings as the pull-out force of conventional ball-and-socket joints made without a corresponding bulge of the closing ring. Similar conditions were able to be determined by the measurement of the resistance to the lifting out of the pivot pin 4 from the joint housing 1.

Furthermore, FIG. 2 shows the detail of the ball-and-socket joint before the closing ring 7 is pressed in. The outer end 11 of the joint housing 1 is not yet flanged at this phase of the manufacture. The closing ring 7 with its bulge 8 is introduced between the joint housing 1 and the bearing shell 5 into the recess 2 and is pressed in there by the force F. The ring-shaped recess 8 now engages a recess or groove, not shown, on the inner surface 13 of the joint housing 1. Since the closing ring 7 is thus securely fixed within the joint housing 1, the displacement of the closing ring 7 and the bearing shell 5 within the housing recess 2, which would otherwise frequently occur during the subsequent flanging of the end areas 11 of the joint housing due to the forces occurring at the rolled edge, will not occur. It is ensured as a result that no undesired offset will occur between the central axis of the closing ring 7 and the central axis 6 of the joint housing 1. After the flanging of the joint housing 1, the closing ring 7, which is already fixed in the joint housing 1 by its bulge 8, is supported by the housing collar being formed now with the surface 12. Due to the barb-like engagement of the closing ring 7, pulling forces generated in the axial direction are not absorbed exclusively by the surface 12, as is usual, so that the pull-out strength of the ball-and-socket joint and the resistance of the ball-and-socket joint to leverages occurring will markedly increase.

It can also be recognized from FIG. 2 that the bearing shell 5 has a reduced wall thickness in the area 15 in which the closing ring 7 comes into contact after pressing in, as is apparent from FIG. 3. This advantageously leads to a reduction in the axial elasticity. Even though this advantageous effect is also present already if the wall thickness of the bearing shell 5 is reduced in this area 15 in some sections only in relation to its circumference, it is advantageous for this area 15 of reduced wall thickness to be formed over the entire circumference of the bearing shell 5.

Figure 4:
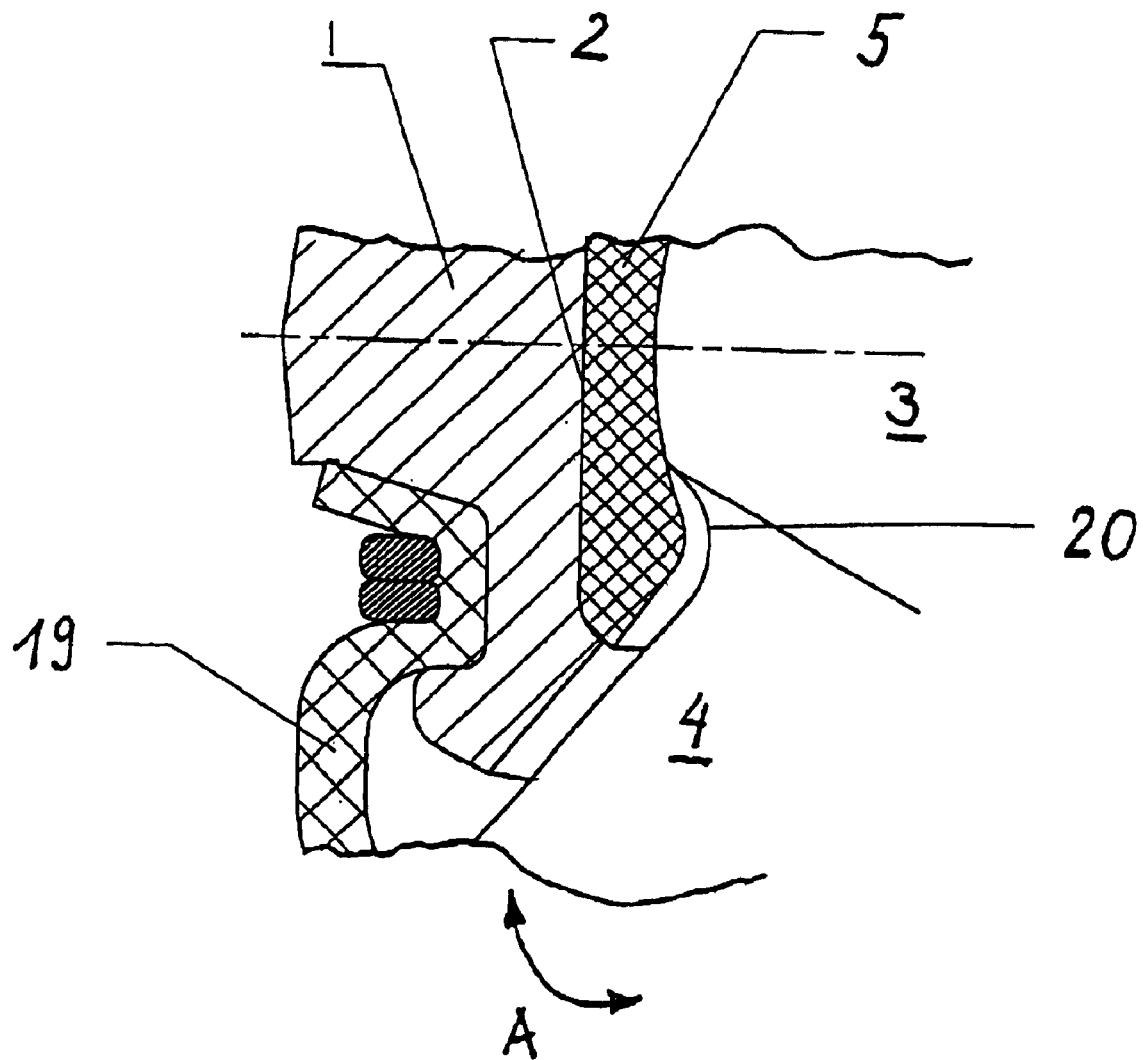
FIG. 4 is a sectional view of a ball-and-socket joint according to the state of the art.

FIG. 4 shows a detail of a prior-art ball-and-socket joint design, which has especially the drawback that a flute 20 is present in the transition area between the joint ball 3 and the pin section of the pivot pin 4. The pivot pin 4 pivotable in the direction of arrow A transports during its movement contaminants, which are located in the said flute 20, directly into the bearing surface between the bearing shell 5 and the joint ball 3, which is clearly visible from the view in FIG. 4.

While specific embodiments of the invention have been shown and described in detail to illustrate the application of the principles of the invention, it will be understood that the invention may be embodied otherwise without departing from such principles.

What is claimed is:

1. A ball-and-socket joint comprising:
   a joint housing, said joint housing having a housing opening on at least one side and having a housing recess;
   a pivot pin mounted in said housing recess, said pivot pin including a joint ball provided with surface protection and including a pin section protruding from the housing opening;
   a bearing shell arranged between said joint housing and said joint ball; and
   a closing ring, said closing ring closing said housing recess of the joint housing and tensioning said bearing shell arranged therein in said joint housing, said closing ring having an inner contour with a bevel or a radius essentially following an outer contour of the bearng shell, said closing ring being fixed in a position in said joint housing and having a sealing lip in sealing contact with said joint ball under elastic pretension on a side of the housing opening through which said pin section of said pivot pin protrudes from said joint housing, said sealing lip comprising rubber vulcanized to said closing ring.

2. A ball-and-socket joint in accordance with claim 1, wherein said closing ring has a flange section on a side facing said pin section of said pivot pin and has an outer contour with at least one bulge, said closing ring being pressed into said joint housing and engaging with at least one recess of an inner surface of said joint housing in a fixed position.

3. A ball-and-socket joint in accordance with claim 2, wherein said flange section of said closing ring is determined by an at least partial material deformation in said joint housing.

4. A ball-and-socket joint in accordance with claim 1, wherein said sealing lip is inserted into a groove prepared in said closing ring.

5. A ball-and-socket joint in accordance with claim 2, wherein said bulge on said outer contour of said closing ring has a height of between 0.2 mm and 0.3 mm in relation to the adjacent areas of said outer contour.

6. A ball-and-socket joint in accordance with claim 2, wherein said bulge on said outer contour of said closing ring has a circular ring shape, said bulge engaging a circular groove provided on said inner surface of said joint housing.

7. A ball-and-socket joint in accordance with claim 2, wherein a plurality of said bulges are provided extending circularly in a ring-shaped manner on said outer contour of said closing ring to form a sawtooth shaped contour.

8. A ball-and-socket joint in accordance with claim 7, wherein said bulges include a first flank of said sawtooth shaped contour made longer than an each additional flank, said flanks extending with a slope in a direction of said housing opening engaging grooves which have the same slopes and extend circularly on said inner surface of said joint housing in an interlocking manner.

9. A ball-and-socket joint in accordance with claim 2, wherein said bulge, of which there is at least one and which is provided on the outer contour of said closing ring and extends substantially circularly in with substantially a ring shape and is interrupted in some areas.

10. A ball-and-socket joint in accordance with claim 1, wherein said bearing shell has a reduced wall thickness in an area that is in contact with said inner contour of said closing ring compared with a wall thickness of said bearing shell.

11. A ball-and-socket joint in accordance with claim 10, wherein said area of said bearing shell which is in contact with said inner contour of said closing ring has a reduced wall thickness in some sections in relation to a circumference of said bearing shell.

12. A ball-and-socket joint in accordance wit claim 1, wherein an outside diameter surface of said joint ball passes smoothly over into said pin section of said pivot pin.

13. A ball-and-socket joint in accordance with claim 12, wherein a radius R of transition between said joint ball and said pin section of said pivot pin is kept at a minimum.

14. A ball-and-socket joint in accordance with claim 12, wherein a radius R of transition between said joint ball and said pin section of said pivot pin is not present.

15. A ball-and-socket joint in accordance with claim 12, wherein an outside surface of said joint ball has a maximum surface roughness (Ry) between 1 $\mu$m and 5 $\mu$m.

16. A ball-and-socket joint comprising:
    a joint housing defining a housing opening and defining a housing recess;
    a pivot pin mounted in said housing recess, said pivot pin including a joint ball and including a pin section protruding from said housing opening;

a bearing shell arranged between said joint housing and said joint ball; and a closing ring fixed in said housing recess of said joint housing, said closing ring having an inner contour substantially following an outer contour of said bearing shell, said closing ring including a sealing lip in sealing contact with said joint ball under elastic pretension at said housing opening to seal said joint ball in said housing recess, said closing ring having an outer surface with a metal portion arranged in direct contact with said joint housing, said sealing lip being formed of rubber and vulcanized to an inner surface of said metal portion of said closing ring.

17. A ball-and-socket joint comprising:

a joint housing defining a housing opening and defining a housing recess, said joint housing also defining a groove;

a pivot pin mounted in said housing recess, said pivot pin including a joint ball and including a pin section protruding from said housing opening;

a bearing shell arranged between said joint housing and said joint ball; and a closing ring fixed in said housing recess of said joint housing, said closing ring having an inner contour substantially following an outer contour of said bearing shell, said closing ring including a sealing lip in sealing contact with said joint ball under elastic pretension at said housing opening to seal said joint ball in said housing recess, said closing ring having an outer surface with a metal portion, said sealing lip being formed of rubber and vulcanized to an inner surface of said metal portion of said closing ring, said metal portion of said closing ring including a bulge engaging said groove of said housing.

18. A ball-and-socket joint comprising:

a joint housing defining a housing opening and defining a housing recess;

a pivot pin mounted in said housing recess, said pivot pin including a joint ball and including a pin section protruding from said housing opening;

a bearing shell arranged between said joint housing and said joint ball; and a closing ring fixed in said housing recess of said joint housing, said closing ring having an inner contour substantially following an outer contour of said bearing shell, said closing ring including a sealing lip in sealing contact with said joint ball under elastic pretension at said housing opening to seal said joint ball in said housing recess, said closing ring having an outer surface with a metal portion, said sealing lip being formed of rubber and vulcanized to an inner surface of said metal portion of said closing ring, said closing ring including a radially extending flange at one axial end of said closing ring, said joint housing includes a support surface supporting said closing ring through said flange, said support surface being formed by flanging an end of said joint housing.

19. A ball-and-socket joint comprising:

a joint housing defining a housing opening and defining a housing recess;

a pivot pin mounted in said housing recess, said pivot pin including a joint ball and including a pin section protruding from said housing opening;

a bearing shell arranged between said joint housing and said joint ball; and a closing ring arranged between said bearing shell and said joint housing with respect to a radial direction of said pivot pin, said closing ring having an inner contour substantially following an outer contour of said bearing shell, said closing ring including a sealing lip in sealing contact with said joint ball under elastic pretension at said housing opening to seal said joint ball in said housing recess, said closing ring having an outer surface with a metal portion, said sealing lip being formed of rubber and vulcanized to an inner surface of said metal portion of said closing ring.

20. A ball-and-socket joint comprising:

a joint housing defining a housing opening and defining a housing recess;

a pivot pin mounted in said housing recess, said pivot pin including a joint ball and including a pin section protruding from said housing opening;

a bearing shell arranged between said joint housing and said joint ball; and a closing ring fixed in said housing recess of said joint housing, said closing ring having an inner contour substantially following an outer contour of said bearing shell, said closing ring including a sealing lip under elastic pretension at said housing opening to seal said joint ball in said housing recess, said closing ring having an outer surface with a metal portion arranged in direct contact with said joint housing, said sealing lip being formed of rubber and being vulcanized to an inner surface of said metal portion of said closing ring.

21. A ball-and-socket joint in accordance with claim 20, wherein:

said closing ring includes a radially extending flange at one axial end of said closing ring;

said joint housing includes an end receiving said flange;

said closing ring includes a bulge axially spaced from said flange;

said joint housing defines a groove engaging said bulge of said closing ring.

22. A ball-and-socket joint in accordance with claim 1, wherein:

said sealing lip is arranged on an inside of said closing ring;

a sealing bellows is arranged between said joint housing and said pivot pin.

* * * * *